United States Patent [19]
Vasilakes et al.

[11] Patent Number: 5,626,708
[45] Date of Patent: May 6, 1997

[54] TAPE APPLYING APPARATUS

[75] Inventors: Lloyd S. Vasilakes, Stillwater, Minn.; Adelio Lissoni, Vedano Olona, Italy

[73] Assignee: Minnesota Mining and Manufacturing, St. Paul, Minn.

[21] Appl. No.: 611,997

[22] Filed: Nov. 9, 1990

[51] Int. Cl.$^6$ .................................................. B32B 31/00
[52] U.S. Cl. ..................... 156/468; 156/477.1; 156/479; 53/137.2
[58] Field of Search ................... 156/475, 477.1, 156/468, 479; 53/137.1, 137.2; 403/321

[56] References Cited

U.S. PATENT DOCUMENTS

| | | | |
|---|---|---|---|
| 2,841,305 | 7/1958 | Werner | 156/478 |
| 3,915,786 | 10/1975 | Collett et al. | 156/355 |
| 3,954,550 | 5/1976 | Patterson | 156/486 |
| 4,045,273 | 8/1977 | Loveland et al. | 156/486 |
| 4,061,526 | 12/1977 | Warshaw et al. | 156/468 |
| 4,238,269 | 12/1980 | Deering, Jr. | 156/465 |
| 4,392,911 | 7/1983 | Ulrich et al. | 156/468 |
| 4,572,760 | 2/1986 | Marchetti | 156/468 |
| 4,643,707 | 2/1987 | Marchetti | 156/468 |
| 4,732,644 | 3/1988 | Chiu | 156/468 |
| 4,781,786 | 11/1988 | Lerner et al. | 156/468 |

FOREIGN PATENT DOCUMENTS

| | | | |
|---|---|---|---|
| 0005888 | 12/1979 | European Pat. Off. | 53/137 |
| 0177003 | 4/1986 | European Pat. Off. | |
| 2812610 | 10/1978 | Germany | 53/137 |
| 8604756 | 5/1986 | Germany | |
| 1245507 | 7/1986 | U.S.S.R. | 53/137 |

OTHER PUBLICATIONS

Brochure Entitled "3M–Matic 77R Random Case Sealer".
Brochure Entitled "3M–Matic 22A Adjustable Case Sealer".
Brochure Entitled "3M–Matic 77A Adjustable Case Sealer".

*Primary Examiner*—David A. Simmons
*Assistant Examiner*—Paul M. Rivard
*Attorney, Agent, or Firm*—Kinney & Lange, P.A.

[57] ABSTRACT

A mounting mechanism for mounting a taping head in an upper bridge structure of a tape applying machine includes J-configured slots that are engaged by pin members extending from the taping head. A tape supply roll holder for holding a supply roll of tape for a lower taping head disposed on a carriage of the tape applying machine. The tape supply roll holder holds the roll of tape at a position that is viewable by the operator of the machine. A mechanical stop retains a pneumatically operable bridge structure in a raised position in the tape applying machine when the pneumatic circuit is in non-operable state. An emergency stop switch means is disposed on an upper surface of the bridge structure such that it is accessible from either side of the machine. A pair of spaced apart compression rollers are positioned to engage upper opposing portions of a box traveling across the carriage so that edge portions of upper flap members of the box are positioned in substantially parallel relationship to each other for taping by the upper taping head.

16 Claims, 11 Drawing Sheets

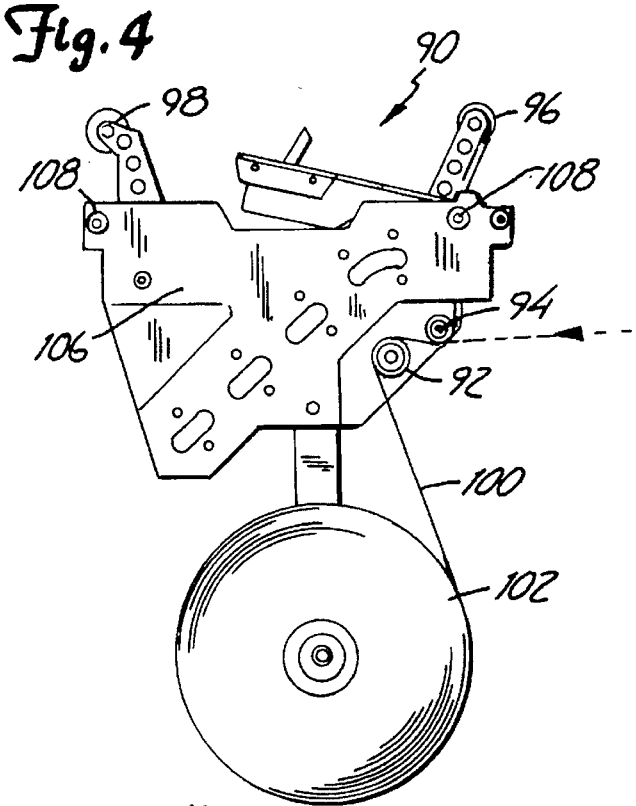
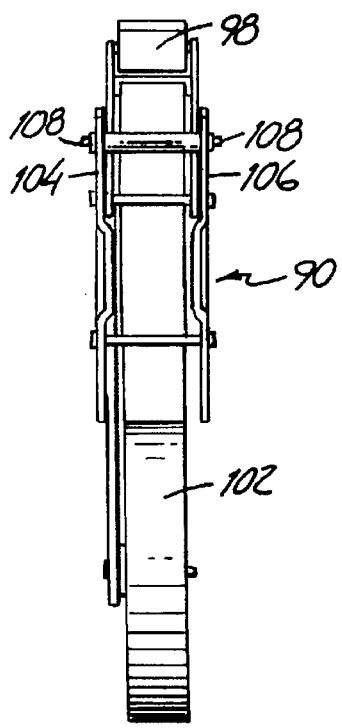
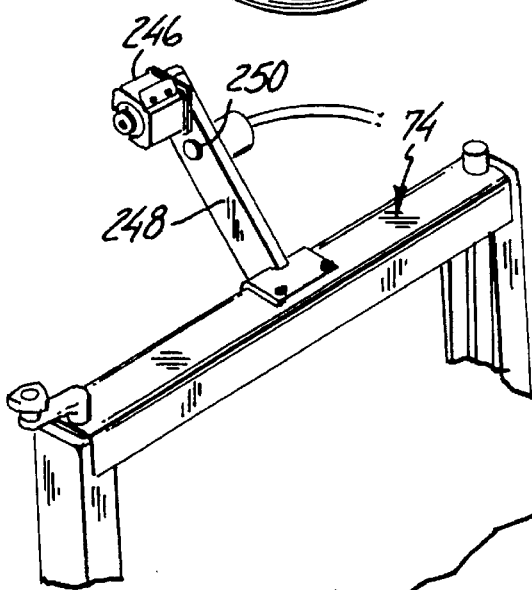
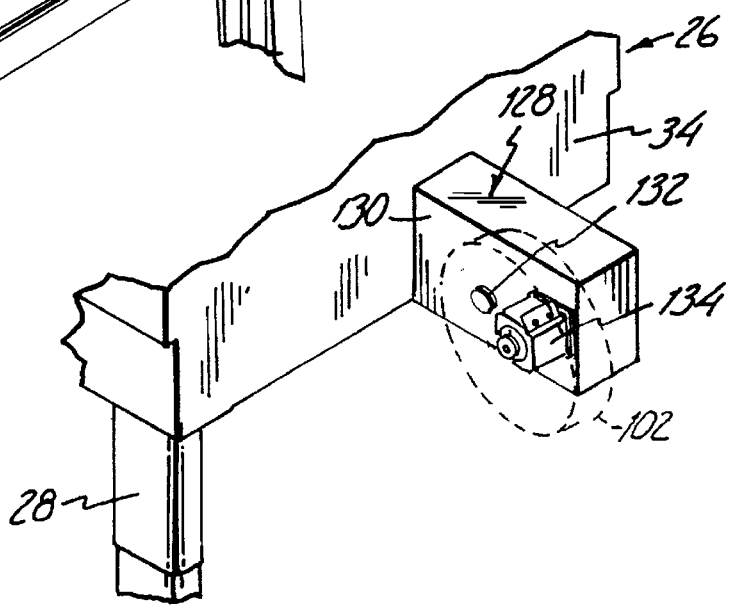

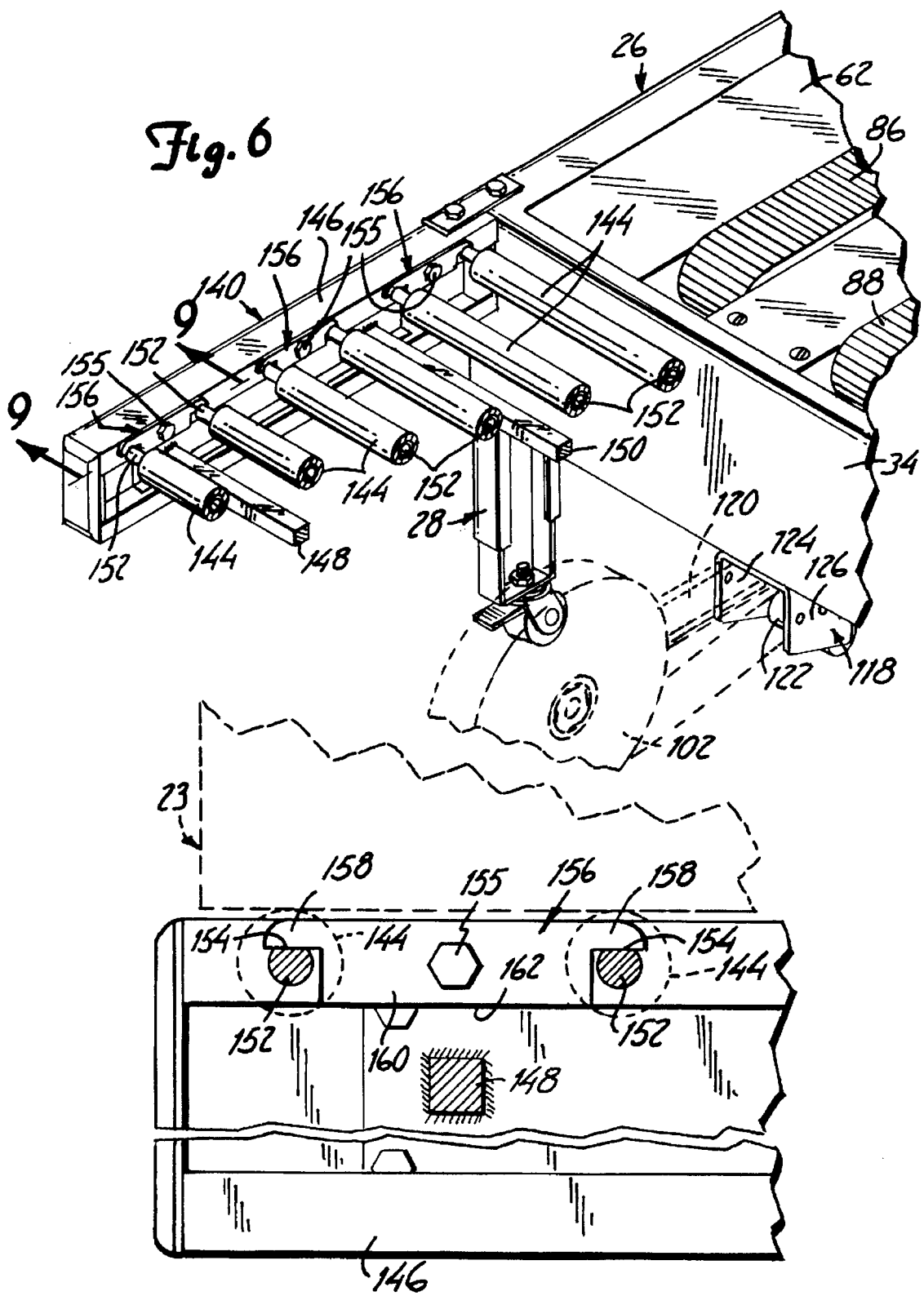

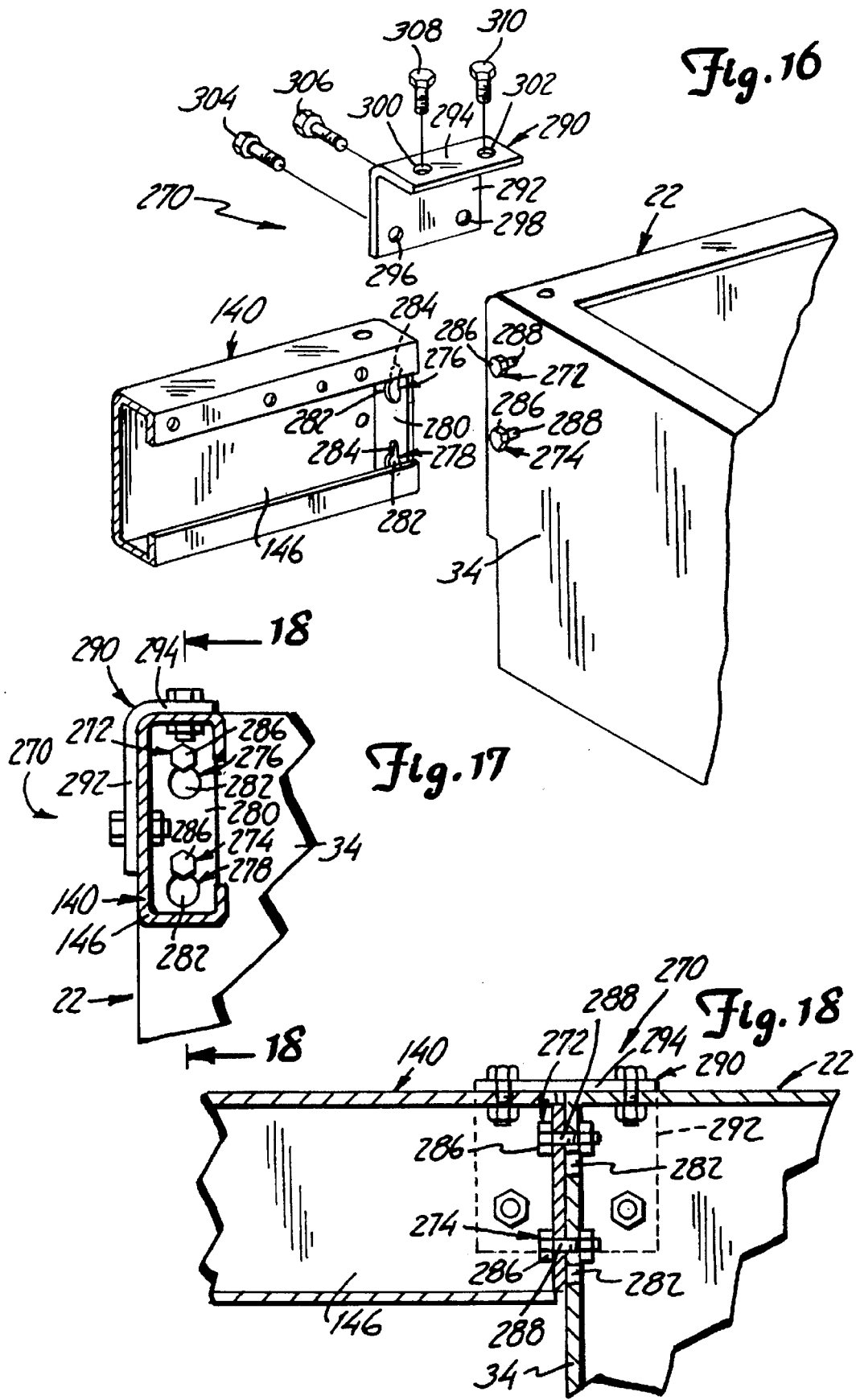

TAPE APPLYING APPARATUS

BACKGROUND OF THE INVENTION

The present invention relates to machines for applying tape to boxes.

Examples of devices for applying adhesive coated tape to boxes and like objects are described in the Collet et al. U.S. Pat. No. 3,915,786, the Patterson U.S. Pat. No. 3,954,550, and the Deering, Jr. U.S. Pat. 4,238,269. In addition, Minnesota Mining and Manufacturing Company of Saint Paul, Minn., manufactures and markets a line of tape applying machines sold under the trademarks 3M-MATIC 22A ADJUSTABLE CASE SEALER, 3M-MATIC 77A ADJUSTABLE CASE SEALER, and 3M-MATIC 77R RANDOM CASE SEALER.

Such machines have removable taping heads which from time to time need to be removed from the machine for maintenance. In the case of the tape applying machines marketed by Minnesota Mining and Manufacturing Company, the upper taping heads are secured within the machine by four screws. Although this permits the removal of the taping heads relatively easily, there is a need for removing the taping heads in a more convenient and efficient manner.

In such machines, there is typically an upper taping head and a lower taping head so that both the upper and lower flaps of a box are sealed simultaneously, as the box travels through the machine. In operating such machines on a continual basis, an operator must monitor the amount of tape on the supply roll so that the taping machine does not run out of tape. In the case of the upper taping head, this is not a problem since the supply roll of tape is easily viewable. However, with respect to the lower taping head, the roll of tape is typically beneath the carriage of the taping machine, and it is often times difficult to keep track of how much tape is left on the supply roll.

Such machines also include conveyor sections that are detachably attachable to the carriage of the machine. The conveyors have freely rotatable rollers on which boxes travel into the tape applying machine, and on to which boxes travel out of the tape applying machine. It is important that such conveyors be level since the rollers are freely rotatable, so that the boxes do not drop off the conveyors when left unattended. Short conveyor sections do not have their own legs and are typically hung from the carriage, the extent to which such conveyors are level depends on the leveling of the machine and the point of attachment to the conveyor. In the normal course of operating such machines, operators and other personnel may lean on the conveyor sections or heavy boxes may be placed on the conveyor sections, weakening the connection to the machine, and affecting the degree to which the conveyors are leveled.

Another problem with prior art conveyors involves the freezing of bearings on which the rollers rotate. Such rollers revolve about shafts that are fixedly attached to side frame members at both of the shaft's ends. However, the bearings on which such shafts rotate occasionally freeze due to the invasion of dust, dirt, and foreign objects into the bearings. As boxes travel over a frozen conveyor roller, the force applied by the traveling box is transmitted as torque on the shaft. In the prior art, such shafts are attached to the side frames of the conveyor through the use of a hex-configured end portion that fits into a hex hole in the side frame. Eventually, the torque that is transmitted by boxes rolling over a frozen roller will twist the shaft in the hex hole, stripping the hex hole and thereby causing a more expensive repair. Since such frozen shafts are not easily detectable, the turning of the shaft within the now worn out hex hole can continue for an extensive period of time and cause considerable damage to the conveyor frame.

Another problem exists in tape applying machines which automatically center boxes as they travel through the machine, and which adjust the height of the upper taping head to accommodate boxes of various heights. The structure that holds the upper taping head is adjustable through a pair of pneumatic cylinders that are activated by a switch that is engaged by a box traveling through the machine. This system works very well. However, with new regulations promulgated under the Occupational Safety and Health Act, all industrial machines cannot have any stored energy within the machine. In the case of a pneumatically operated machine, the pressurized air must be relieved when the machine is shut off. This results in a problem for performing maintenance on the bridge structure of automatically adjustable tape applying machines, since the bridge structure will be in the down position when the machine is shut off. There are instances in which the bridge structure is needed in the up position to perform maintenance.

To tape the top flaps of boxes, a compression roller on either side of the box has been positioned in prior art tape applying machines. The compression roller engages a top portion of the box and attempts to ensure that the edge portions of the flaps are in abutting relationship. However, parallel taping of the edge portions of the top flaps of the box has not always been successful using such compression rollers.

SUMMARY OF THE INVENTION

The present invention includes several improvements to tape applying machines.

The present invention includes a mounting mechanism for mounting a tape head in a tape applying machine. The mechanism includes first and second spaced apart panels within the machine that define a taping head receiving aperture. Each panel has a pair of spaced apart J-configured slots, each slot having an open end. The taping head includes two pair of pin members extending outwardly from opposing sides of the taping head with the pin members being disposed to engage the J-configured slots. In a preferred embodiment, the mounting mechanism is used to mount the taping head in a bridge structure of a tape applying machine. The J-configured slots can be positioned so that entry into the taping head receiving aperture can be either from the bottom or top.

Additionally, the present invention also includes a mechanism for retaining shafts of rollers in a conveyor that is attachable to a carriage of preferably a tape applying machine. The conveyors include rollers that are rotatably attached to shafts, which in turn are fixedly attached to a frame member of the conveyor. The mechanism includes a slot defined by a slot surface that is disposed within a shaft. A retaining member is fixedly attached to the frame member of the conveyor and has a main body portion and a tab portion extending from the main body portion. When mounted, the tab portion is disposed within the slot, engaging the slot surface, thereby preventing rotation of the shaft with respect to the frame member. In a preferred embodiment, the main body portion includes two tab members extending outwardly from the main body portion to engage respective slots in adjacent shafts of rollers in the conveyor.

The present invention also includes a connecting mechanism for connecting a conveyor to a tape applying machine.

The conveyor includes first and second spaced apart frame members and a plurality of rollers rotatably attached to shafts with the shafts being disposed between and connected to the frame members. The conveyor is attachable to a first panel face of the machine. The connecting mechanism includes first and second pin means laterally spaced apart and extending outwardly from the panel face of the machine. Each pin means has a shaft portion and a nodule located at a distal end of the shaft portion. Key hole means are disposed at one end of the spaced apart frame members with the key hole means having a first aperture portion that is larger in diameter than the nodule of the pin means such that the pin means is insertable into the first aperture portion. The key hole means also includes a second aperture portion that is less in diameter than the nodule but is sufficiently large in diameter to accept the shaft portion of the pin means. In a preferred embodiment, the pin means are bolts that threadably engage the panel face of the tape applying machine. After the bolts are inserted into the key holes, the bolts are tightened securing the frame member to the panel face of the tape applying machine.

The present invention also includes a tape supply roll holder for holding a supply roll of tape in a tape applying machine. The tape applying machine includes a carriage and a plurality of ground engaging legs for retaining the carriage above the ground. A taping head is disposed within the carriage for applying tape to boxes that travel across a top surface of the carriage. The tape supply roll holder includes a bracket portion and an arm portion. The arm portion is attached to the bracket portion and the bracket portion in turn is fixedly attached to the carriage at a lower position of the carriage. The arm portion has a distal end that is disposed at a position away from the carriage such that a supply roll of tape can be mounted at the distal end so as not to be located underneath the carriage and is easily viewable by the operator.

Additionally, the present invention includes a mechanical stop for retaining a pneumatically operable bridge structure in a raised position in a tape applying machine. The mechanical stop retains the bridge structure in the raised position when the pneumatic circuit is in a non-operable state. This is particularly useful when maintenance of the machine is required with the bridge structure in the raised position.

The present invention also includes an emergency stop switch means disposed on an upper surface of a bridge structure in a tape applying machine. The emergency stop switch is advantageously located to be reachable from either side of the machine in case of an emergency.

The present invention also includes a pair of spaced apart compression roller means, each roller means having a pair of rollers positioned on each side of the path of travel of boxes through the machine. The rollers are positioned to engage an upper surface portion of the box by compressing the upper surface portions of the box to ensure that the upper flaps are in substantially abutting relationship when being taped.

BRIEF DESCRIPTION OF THE DRAWINGS

FIG. 4 is a side elevational view of the taping head.

FIG. 5 is a front elevational view of the taping head.

FIG. 6 is a perspective view of a tape mounting bracket and conveyor of the present invention.

FIG. 7 is a perspective view of a low tape sensing device of the present invention.

FIG. 9 is a cross sectional view taken along the line 6—6 in FIG. 6.

FIG. 15 is a perspective view of the upper cross bar and low tape sensor.

FIG. 16 is an exploded perspective view of a mechanism for attaching the conveyor to the carriage of the machine of the present invention.

FIG. 17 is an elevational view partially in section showing the mechanism for attaching the conveyor to the carriage.

FIG. 18 is a sectional view taken along the line 18—18 in FIG. 17.

DETAILED DESCRIPTION OF THE PREFERRED EMBODIMENTS

Figure 1:
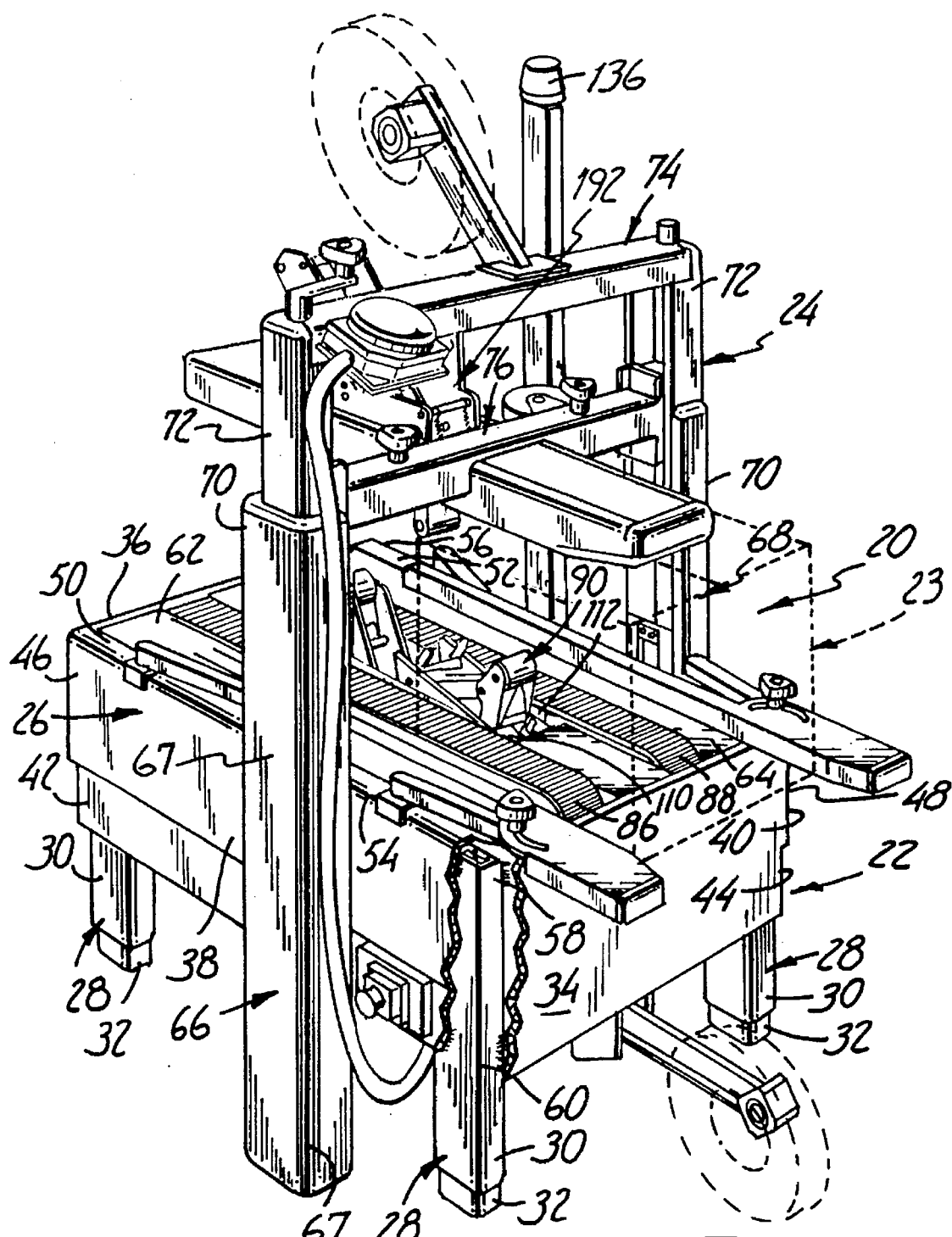
FIG. 1 is a perspective view of one embodiment of a machine of the present invention.

One embodiment of a tape applying machine of the present invention is generally indicated at 20 in FIG. 1. The machine 20 will be marketed under the trademark of 3M-MATIC 200a ADJUSTABLE CASE SEALER by Minnesota Mining and Manufacturing Company of Saint Paul, Minn. Other embodiments of the tape applying machine of the present invention will be discussed subsequently in reference to other figures.

For purposes of this application, the following terms will be used in referring to the spacial arrangement of the various elements of the various embodiments of the machine of the present invention. By machine direction is meant that direction which boxes are transported through the machine. By the transverse direction is meant that direction which is transverse to the machine direction. By infeed section is meant that section of the machine which boxes enter. By outfeed section is meant that section of the machine which boxes exit. Throughout the views like elements will be referred to by like reference characters.

The tape applying machine 20 includes a carriage 22 and an overhead tape applying bridge 24 that is attached to the carriage 22. A box 23 to be taped travels on the carriage and below the bridge 24. Although not limited to the type of box that the machine 20 will apply tape to, the box 23 typically will have bottom flaps and top flaps that have edge portions disposed in the machine direction that require tape application along abutting edge portions to seal the box.

The carriage 22 includes a bed 26 and a plurality of legs 28 for supporting the bed 26 above the ground. Preferably, each leg 28 is adjustable such that the height of the bed 26 is adjustable. Each leg 28 includes an outer leg component 30 having a hollow interior and an inner leg component 32 disposed within the interior of the outer leg component 30 in sliding relationship. The inner leg component 32 is fixed at a selected height with respect to the outer leg component 30 by a conventional bracket mechanism (not shown) that holds the inner and outer leg components in a fixed relationship with each other.

The bed 26 includes front and back panels 34 and 36, respectively, and upper left and right side panels 38 and 40, respectively. The panels 34,36,38 and 40 are preferably welded to form the bed 26, although any suitable method of attaching the panels is within the scope of this invention. The bed 26 further includes lower left and lower right side panels 42 and 44, respectively, that are preferably positioned in an inwardly recessed position from the upper left and right panels 38 and 40.

The upper left and right panels 38 and 40 include side vertical portions 46 and 48, respectively from which top horizontal portions 50 and 52, extend inwardly with respect to the bed 26. Large rounded corners 54 and 56 join the top portions 50 and 52 with the respective side portions 46 and 48. The rounded corners have radii of approximately 25 mm.

The outer legs 28 are connected preferably by welding to the bed 26 at an upper portion 58 thereof proximate the top horizontal portions 50 and 52 of panels 38 and 40 and at lower portions 60 thereof proximate the bottom of the lower edges of the panels 38 and 40.

The bed 26 also includes left and right top horizontal panels 62 and 64. The left and right top panels 62 and 64 are disposed proximate the top horizontal portions 50 and 52 of the side panels 38 and 40.

The bridge 24 includes left and right support columns 66 and 68 that are secured to the bed on left and right sides, respectively. The support columns 66 and 68, each include an outer support column member 70 and an inner support column member 72 which is longitudinally slidably disposed in a conventional manner relative to the outer support column member 70. The outer support column member 70 includes large rounded corners 67 having a radius of approximately 25 mm.

Figure 2:
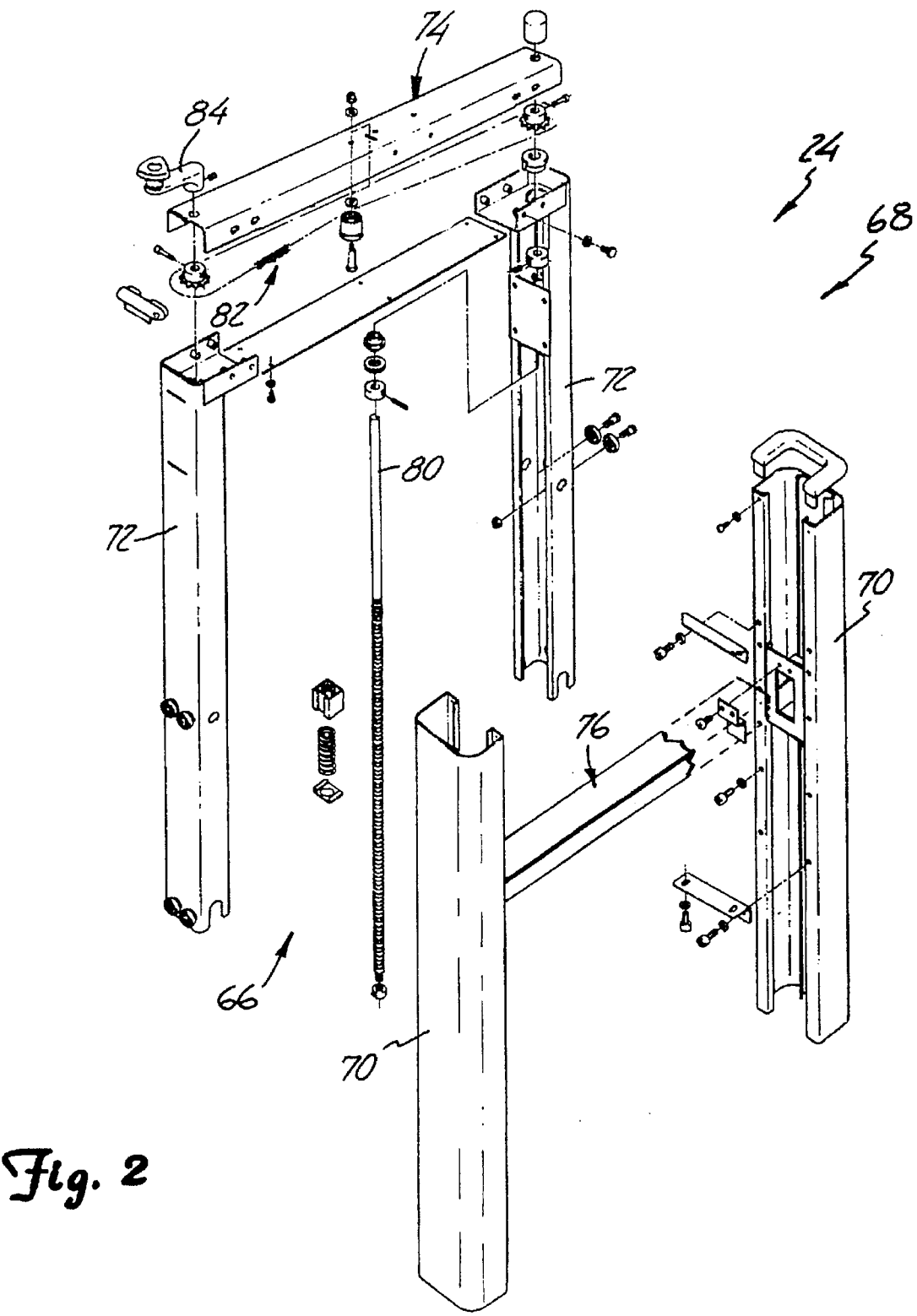
FIG. 2 is an exploded perspective view of the bridge structure of the machine of FIG. 1.

Upper and lower cross bars 74 and 76, respectively, connect the inner support column members 72 and provide a framework for mounting a taping head 78. The height of the framework is adjustable due to the sliding relationship between the inner support column members 72 and the respective outer support column members 70. In one embodiment as illustrated in FIG. 2, lead screws 80 positioned within each inner member 72 operate to raise and lower the bridge 24. The lead screws 80 are connected to each other through a known sprocket and chain linkage 82 which is operable by a single handle 84. Turning the handle 84 operates both lead screws 80 in unison and adjusts the height of the bridge 24. The bridge includes non-rotatable threaded nuts through which the lead screws 80 pass.

Left and right bottom drive belts 86 and 88 are positioned on the bed 26 for transporting the box to be sealed along a top surface of the bed 26, as illustrated in FIG. 1. The drive belts 86 and 88 are synchronously driven by an electric motor (not shown) in a known manner.

Figure 3:
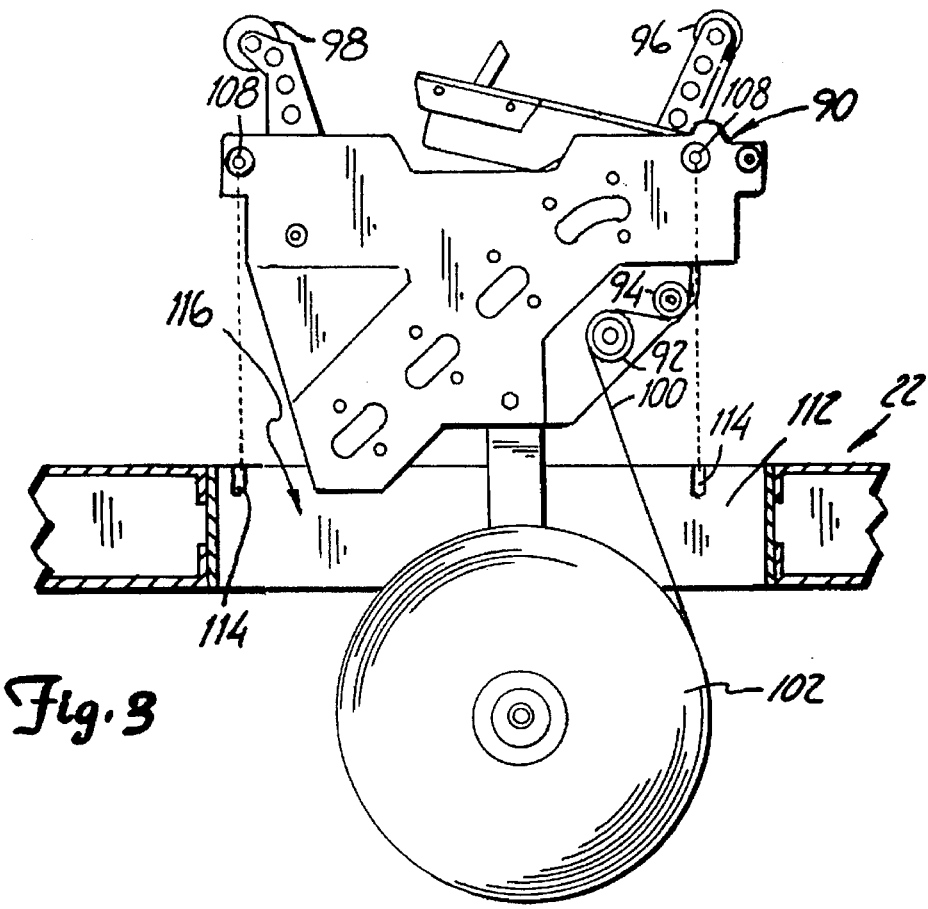
FIG. 3 is a sectional view of a portion of a bed of the machine of FIG. 1 in which a taping head is shown whole.

A lower taping head 90 is disposed between the left and right drive belts 86 and 88 for taping bottom panels of the box being transported along the bed 26. The lower taping head 90, as best illustrated in FIGS. 3, 4, and 5, includes rollers 92, 94, 96, and 98 which define a tape path, and applies tape 100 from a supply roll 102 to the box. The taping head also includes side wall panels 104 and 106 for retaining the rollers 92, 94, 96, and 98 and other components which aid in applying the tape 100. The tape head of the present invention includes spaced apart studs 108 which extend outwardly from the side wall panels 104 and 106. The taping head 90 and variations of the taping head 90 are well known in the art. Examples of such taping heads are described in U.S. Pat. Nos. 3,915,786, 3,954,550 and 4,238,269.

The lower taping head 90 is mounted on to the carriage 22 in a secure and easily removable manner. As illustrated in FIGS. 1 and 3, the bed 26 includes left and right vertically disposed mounting panels 110 and 112 positioned along inner sides of the drive belts 86 and 88. The left and right mounting panels 110 and 112 each include a pair of spaced apart downwardly directed slots 114 and define a low taping head mounting chamber 116 therebetween. The taping head 90 is positioned above the chamber 116 with the studs 108 positioned to engage the slots 114. The taping head 90 is lowered within the chamber until the studs 108 reach the bottom of the slots 114. The taping head 90 is held securely in place by gravity. The lower taping head 90 is removed from the bed 26 by simply lifting the taping head 90 from the chamber 116.

The supply roll 102 on the lower taping head 90 can be mounted directly on the head as illustrated in FIGS. 4 and 5. However, when the supply roll of tape 102 is mounted directly on the lower taping head 90, the amount of tape 100 left on the supply roll 102 is difficult to see since the supply roll 102 is underneath the bed 26. Having knowledge of the amount of tape left on the roll is important in planning the timing of a roll change to ensure that the machine 20 does not run out of tape during operation.

As illustrated in broken lines in FIG. 6, the supply roll 102 of tape can be mounted at a position at which the amount of tape on the roll 102 is easily viewable. The supply roll 102 can be mounted using outboard mounting bracket 118 and mounting arm 120. The bracket 118 is preferably mounted at a position near a lower edge of the forward panel 34. The bracket and arm 120 are positioned such that the supply roll 102 is in the same plane as the tape path defined by the rollers in the taping head. The arm 120 extends away from the panel 34 and the roll 102 is mounted at a distal end which is not underneath the bed so that the roll 102 is viewable with minimal obstruction from the bed 26. It will be understood that mounting the roll of tape 102 at other positions that are not underneath the bed are within the scope of the present invention.

Tape from the supply roll 102 extends inwardly beneath the bed 26 and is guided by a roller 122 rotatably mounted on the bracket 118 to the lower tape applying head 90. The bracket 118 has left and right side walls 124 and 126, either of which can be used to mount the mounting arm 120. The tape from the supply roll 102 travels in a straight line from the distal end of the support arm 120 to the lower taping head 90 avoiding turns and twists which can cause alignment problems of the tape.

A low tape sensor and tape roll mounting assembly 128 can be used to detect tape amounts on the roll 102, as illustrated in FIG. 7, instead of the easily viewable outboard mounting bracket 118 and arm 120, as illustrated in FIG. 7. The low tape sensor and tape roll mounting assembly 128 includes a housing 130 within which is mounted a photosensor 132 and a tape spool 134. The roll of tape 102 is mounted on the spool 134 and is therefore positioned adjacent the photosensor 132. The photosensor 132 is mounted on the housing near the core of the roll of tape so that the photosensor is turned on once the amount of tape on the roll has decreased to a size that exposes the photosensor to sense the absence of tape on the roll. The photosensor is preferably mounted within a slot in the housing by a sliding clamp assembly (not shown) and can be moved radially with respect to the roll 102 to adjust the position at which the photosensor is turned on.

When the photosensor is turned on, the photosensor sends a signal to a light or alarm 136, as illustrated in FIG. 1. The light 136 indicates to the operator that the supply of tape is low and that a new supply roll of tape may be needed. The light is positioned on top of a post 138 that is secured to the carriage 22.

Optionally, an infeed conveyor 140 and an outfeed conveyor 142 are attached to the carriage 22 of the device of the present invention. Since the conveyors 140 and 142 are mirror images of each other, both conveyors will be described with reference to FIG. 6 in which only conveyor 140 is illustrated.

A plurality of rollers 144 are rotatably mounted between side frame members 146 in the transverse direction. Forward and rearward spacer bars 148 and 150 retain and space the side frame members 146 with respect to each other. Each roller 144 includes a shaft 152 on which the roller 144 is mounted to freely rotate through bearings (not shown).

The shaft 152 is attached to the side frame member 146 at its left and right ends in a non-rotatable position. A slot 154 is disposed in the shaft 144 proximate the entry point of the shaft in the side frame member 146, as best illustrated in FIG. 9. A retainer bar 156 is suitably attached such as by a screw 155 to an inside surface of the side frame member 146. The retainer bar includes a slot engaging tab portion 158 that engages the slot 154 of the shaft 144 to prevent rotation of the shaft.

It is desirable to prevent rotation of the shaft 152 since a rotating shaft will wear the side frame at the shaft's and side frame's point of attachment. The problem of preventing the shaft from rotating becomes more difficult if the bearing (not shown) on which the roller 144 rotates freezes. Once the bearing freezes, boxes being transported over the rollers provide torque forces sufficient to turn the shafts of prior art conveyors extensively damaging the conveyors. The retainer bar 156 of the present invention by engaging the slot 152 in the shaft 154 provides sufficient force to counter the forces of the boxes rotating over such rollers.

Preferably, the retainer bar 156 is made from a sheet material such as sheet metal and has a main body portion 160 from which the tab portion 158 extends. In the embodiment illustrated in FIG. 9, the bar 156 includes tab portions 158 extending from opposite sides of the main body portion 160 to engage slots 154 of adjacent shafts 152. In the event that the conveyor includes an odd number of rollers or a single roller, the retainer bar can be modified by eliminating one of the tab portions and some of the main body portion depending on the amount of space available for attaching the bar to the side frame member 146.

The retainer bar 156 also preferably includes a retaining flap section 162 that is disposed approximately at a right angle to the main body portion 156. The flap section 162 engages a bottom surface of a rib component of the frame member 146 and further aids in preventing rotation of the shafts 152.

Figure 8:
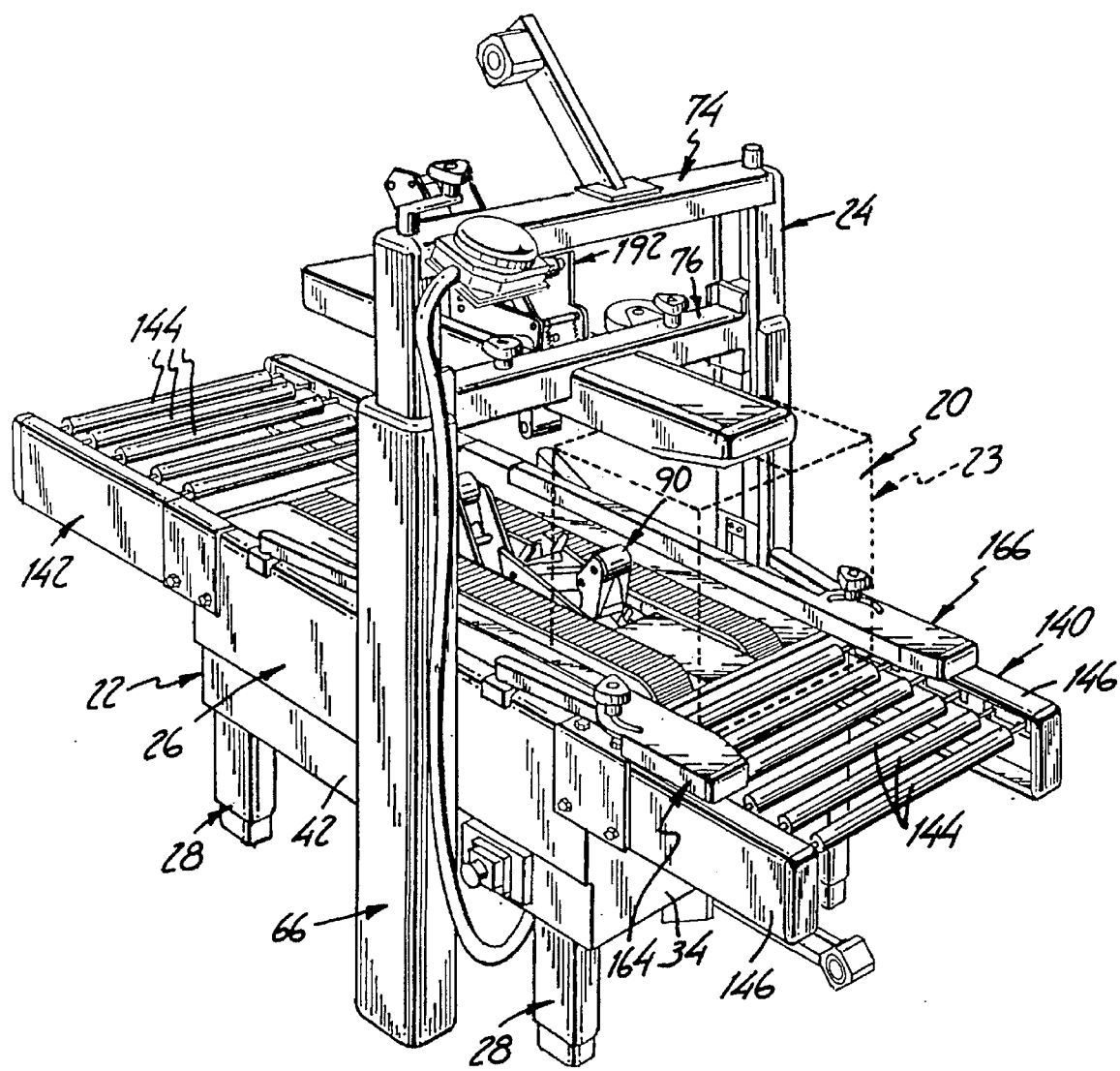
FIG. 8 is a perspective view of an alternative embodiment of the machine of the present invention.
Figure 10:
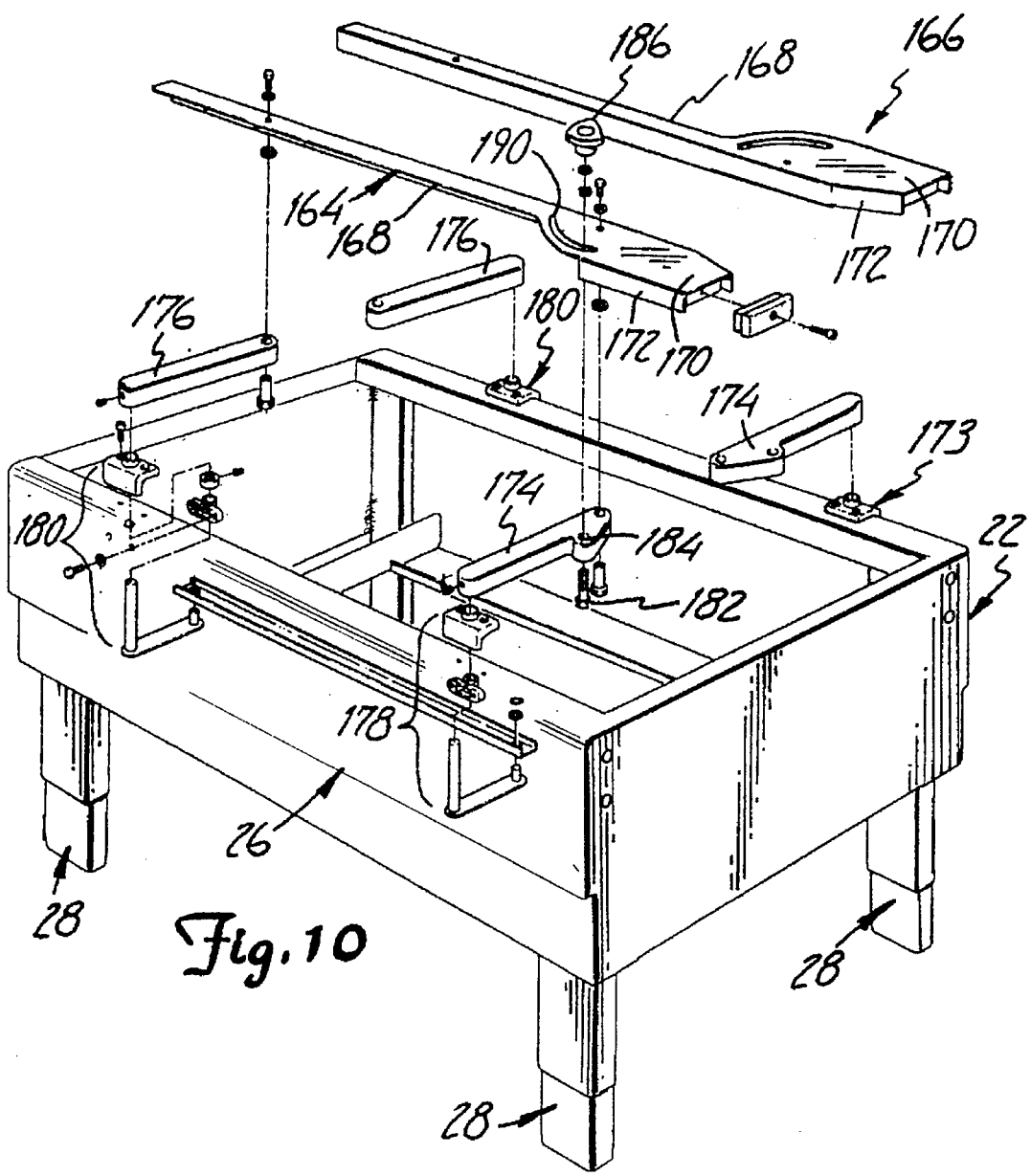
FIG. 10 is an exploded perspective view of a bed guide of the present invention.

Left and right bed guides 164 and 166 center and guide the box as it is transported by the drive belt along the top surface of the carriage 22, as illustrated in FIGS. 8 and 10. Each bed guide 164 and 166 includes an elongated guide member 168. The guide member 168 of the guide 164 is the mirror image of the guide member 168 of the guide 166. Each guide member 168 has a forward feed section 170 that has an inwardly slanted vertical box engaging surface 172, as best illustrated in FIG. 10.

The elongated guide members 168 are pivotally mounted along the top surface of the bed 26 by spaced apart forward and rearward guide member support arms 174 and 176. The guide member support arms 174 and 176 in turn are pivotally mounted to the bed 26 by front and rearward bracket assemblies 178 and 180.

In a preferred embodiment, the elongated guide members 168 are attached to the forward guide support arms 174 by a bolt 182 extending through an aperture 184 in the arm 174 and then through an arcuate slot 190 in the member 168 to threadably engage a handle 186. The arcuate slot 190 provides sufficient freedom to pivot the elongated guide member 168 while providing a mechanism to retain the member 168 in a fixed position. To fix or lock the guide members 168 in position the handle 186 is turned to tighten the handle with the bolt 182.

Figure 11:
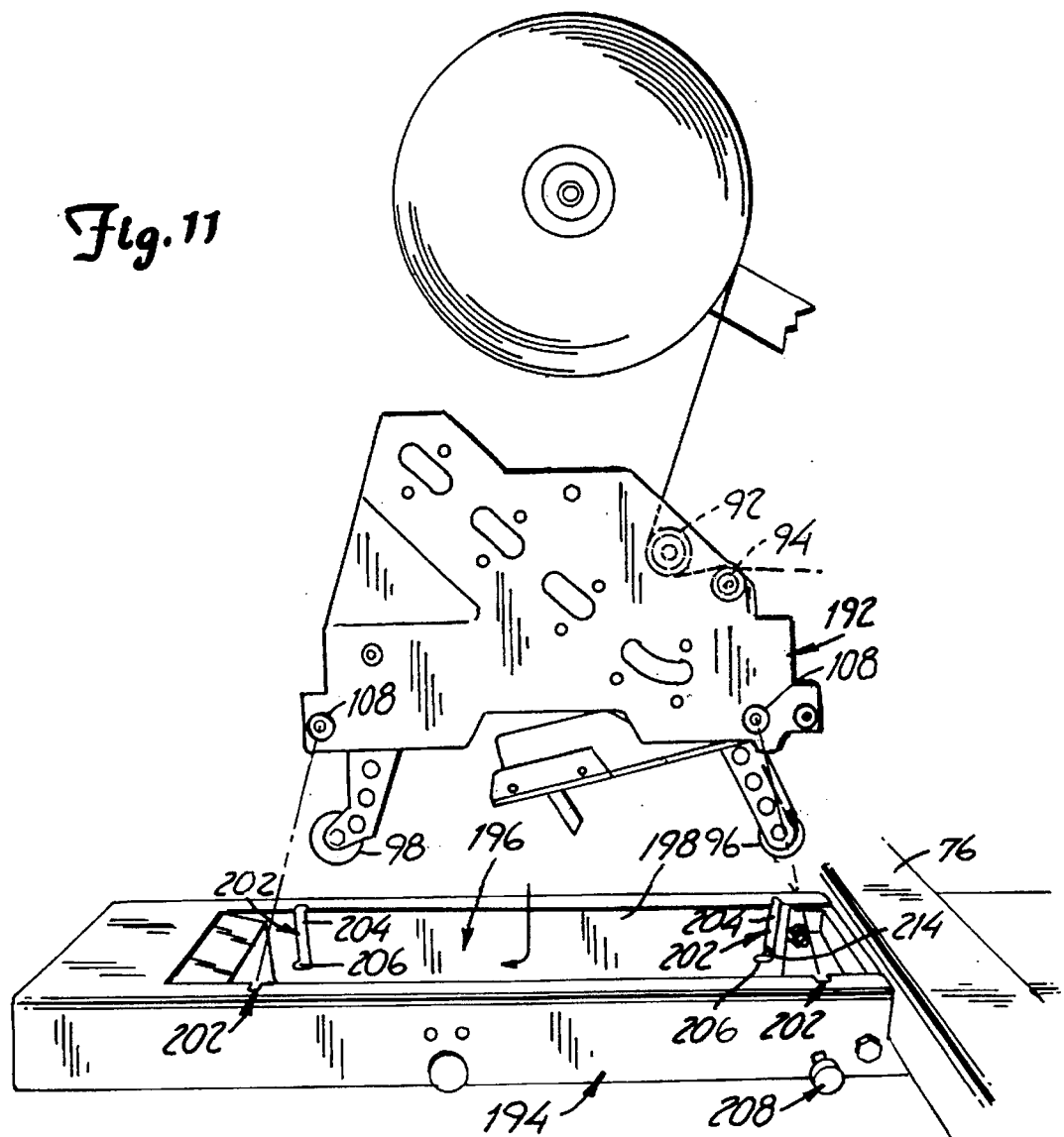
FIG. 11 is a perspective view of an upper taping head and upper taping head mounting assembly of the present invention.

An upper taping head 192 dispenses tape for application to the top of the box 23 traveling along the bed 26, as best illustrated in FIGS. 1 and 8. The upper taping head 192 is similar to the lower taping head 90 in construction, but is mounted upside down so that tape is applied to the top of the box 23, as best illustrated in FIG. 11. The upper taping head 192 is mounted to the bridge 24 by a taping head mounting assembly 194. The taping head mounting assembly 194 is fixedly attached to the lower cross bar 76.

Figure 12:
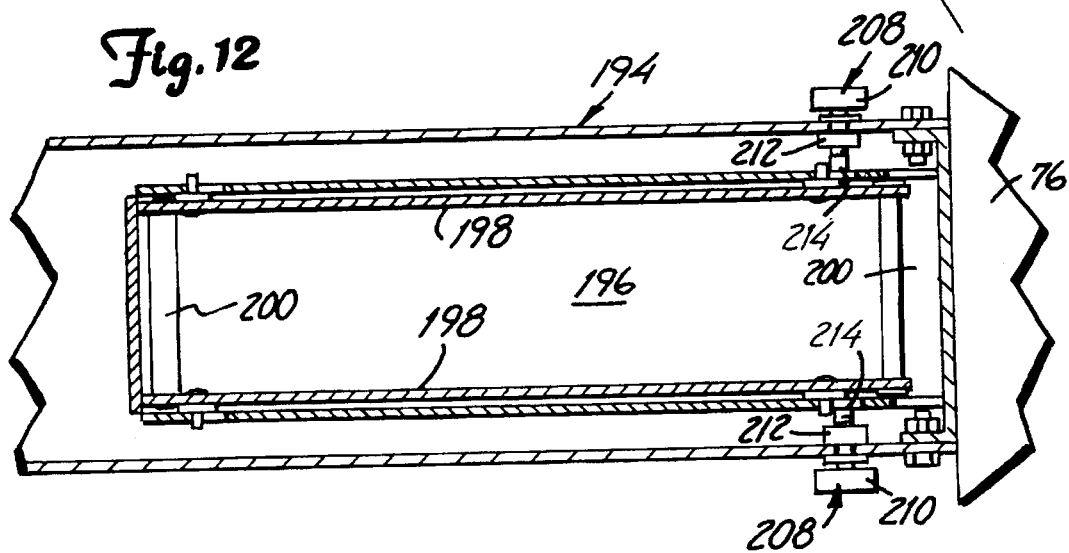
FIG. 12 is a sectional view of the upper taping head mounting assembly illustrated in FIG. 11.

The taping head mounting assembly 194 has a taping head receiving aperture 196, as best illustrated in FIGS. 11 and 12. The taping head mounting assembly 194 is constructed of sheet metal and is attached to the lower cross bar 76 by suitable screws (not shown). The aperture 196 is defined by longitudinal sheet metal side panels 198 and transversely disposed cross panels 200. Spaced-apart J-configured slots 202 are disposed in the panels 198 a distance to accommodate studs 108 that project outwardly from the wall panels of the taping head 192 similarly as the studs 108 of the lower taping head 90. The J-configured slots have a shank portion 204 and an end portion 206 positioned angularly from the shank portion. Preferably the studs 108 on the upper taping head are spaced the same distance from each other as the studs 108 on the lower taping head 90 so that the heads 90 and 192 are interchangeable.

In the embodiment illustrated in FIGS. 11 and 12, the J-configured slots 202 are positioned such that the shank portion 204 is substantially vertical and whose opening is positioned proximate the top of the mounting assembly 194. The end portion 206 of the J-configured slot extends rearwardly in the machine direction.

The taping head 192 is lowered into the aperture 196 with the studs 108 engaging the J-configured slots 202. Once the studs 108 are positioned at the lowest portion of the shank portion 204, the tape head is then moved back until the studs reach the end surface of the end portion 206. To secure the taping head 192, a mechanical stop 208 prevents the head from moving forwardly or upwardly along the shank portion 204 once the studs 108 are fitted within end portions 206. The stop 208 includes a threaded handle portion 210 that engages a threaded nut 212 secured to the sheet metal wall of the assembly 194. A distal end 214 of the handle 210 extends into the J-configured slot 202 proximate the confluence of the shank and end portions 204 and 206. The distal end 214 retains the studs 108 against the end surface of the end portion 206.

Figure 13:
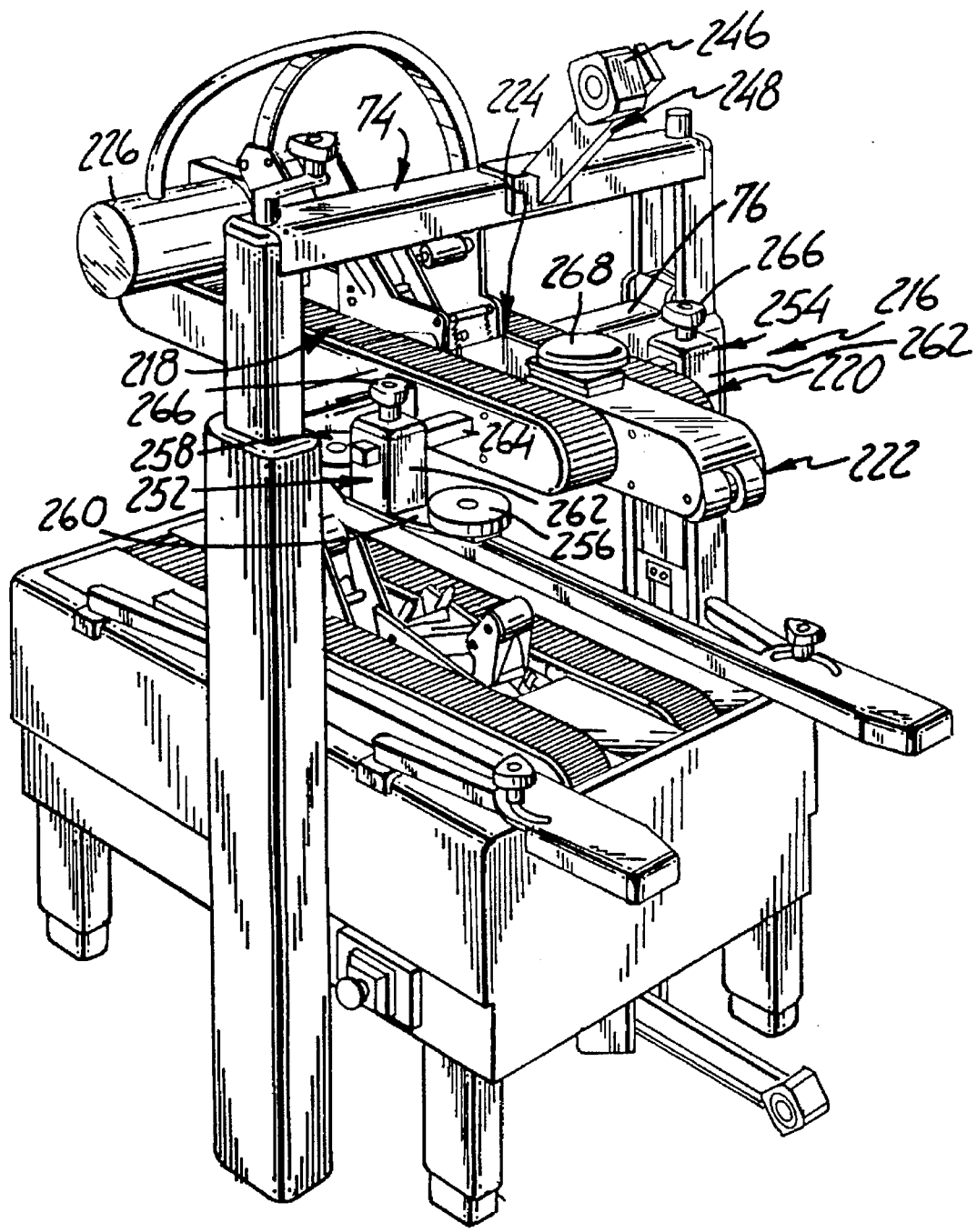
FIG. 13 is a perspective view of yet another alternative embodiment of the machine of the present invention.

In an alternative embodiment generally indicated at 216 in FIG. 13, left and right upper drive belts 218 and 220 are mounted in a taping head mounting assembly 222. The embodiment 216 will be marketed under the trademark 3M-MATIC 700a ADJUSTABLE CASE SEALER. The drive belts 218 and 220 are positioned adjacent an upper taping head receiving aperture 224 as illustrated in both FIGS. 13 and 14. The drive belts 218 and 220 are mounted adjacent the aperture 224 and are driven by an electric motor 226 mounted rearwardly on the assembly 222. To offset the downward force created by the motor being mounted at the rearward end of the assembly 222, the assembly 222 is positioned at a more forward position with respect to the crossbar 76. However, the more forward position of the assembly 222 results in the crossbar 76 being positioned within the aperture 224 and the upper crossbar 74 being positioned directly above the aperture 224 thereby blocking easy access to the aperture 224 from above. The taping head 192 is therefore mounted by inserting the head 192 through the bottom of the aperture 224.

Figure 14:
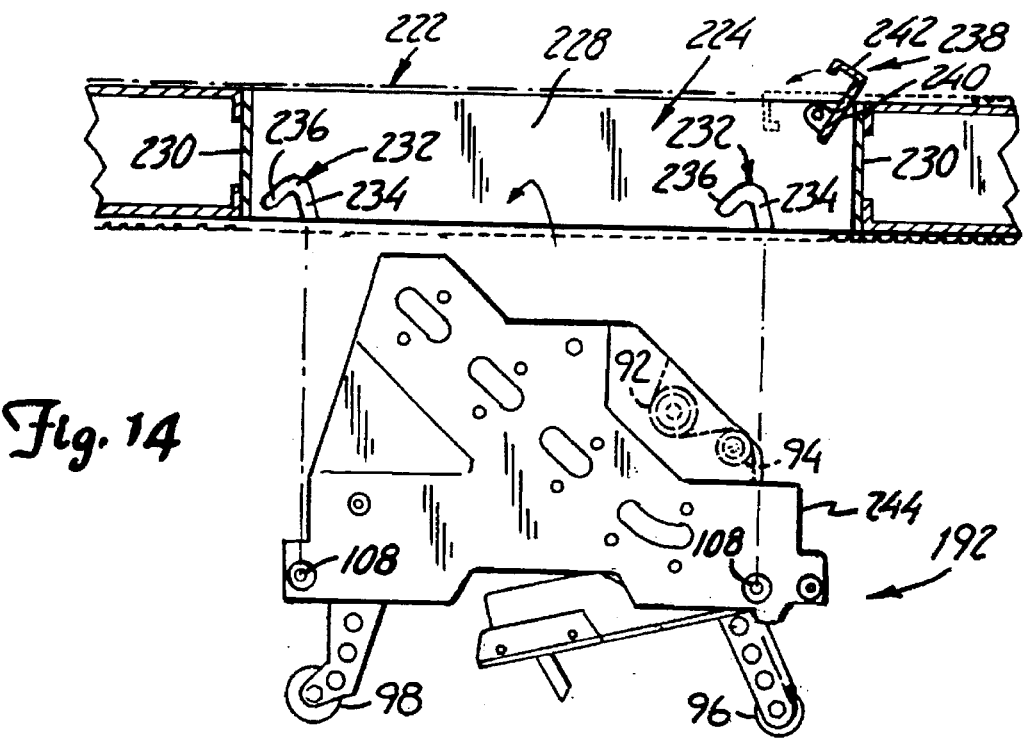
FIG. 14 is a sectional view of the upper taping head mounting assembly of FIG. 13 with the taping head shown whole.

The aperture 224 is defined similarly as aperture 196 illustrated in FIGS. 11 and 12. The aperture 224, as best illustrated in FIG. 14, is defined by spaced-apart side panels 228 and spaced-apart cross panels 230. A pair of spaced-apart J-configured slots 232 are positioned proximate a lower edge of each of the panels 228. The J-configured slots 232 include a shank portion 234 and an end portion 236. The shank portion 234 is preferably positioned at a slight incline from the vertical with the slot opening being disposed at a lower edge of the panel 228 and the end portion 236 is disposed preferably at an acute angle with the respect to the shank portion 234. The J-configured slots 232 are spaced-apart a distance sufficient to engage the studs 108 of the head 192.

The taping head 192 is easily attached to the taping head mounting assembly 222 by positioning the taping head 192 into the taping head receiving aperture 224 from below the assembly 222. The studs 108 are inserted into the respective openings of slots 232 and the head 192 is moved upwardly and guided by the studs 108 engaging the slots 232. When the studs 108 reach the end of the shank portion 234 of the slot 232, the head 192 is permitted to fall to the end surface of the end portion 236.

A safety latch 238 is pivotally mounted within the aperture 224 and when in a down position engages the taping head 192 preventing the head from moving forward due to the forces generated in applying tape. In the embodiment illustrated in FIG. 14, the safety latch 238 is made of sheet metal and includes a main body portion 240 that is pivotally mounted between the panels 228. The latch 238 further includes a taping head engaging portion 242 positioned approximately at a right angle to the main body portion 240. When the latch 238 is in the down or latching position as indicated by broken lines, the taping head engaging portion 242 engages the taping head 192 at vertical forward surfaces 244 providing a substantially horizontal force component against movement of the head within the slots 232.

To remove the upper taping head 192 from the mounting assembly 222, the latch 238 is moved to its unlatching position, and the head is moved upwardly along the end portion 236 of the J-configured slot 232. The head 192 is then moved down the shank portion 234 of the slot and is removed from the head receiving aperture 224.

The supply roll of tape for the upper taping head 192 is preferably mounted on a spool 246 attached to the upper crossbar 74 by support arm/bracket 248, as illustrated in FIG. 15. Tape to the taping head 192 is fed downwardly to the transport rollers in the head 192. A low tape level photosensor 250 is also preferably mounted on the arm/bracket 248 to provide a signal when a low level of tape is on the supply roll.

Left and right compression roller assemblies 252 and 254 are mounted on taping head mounting assembly 222, as illustrated in FIG. 13. Each compression roller assembly includes forward and rearward freely rotatable rollers 256 and 258 that engage the upper surface portions of the box as the box travels through the machine 216. The rollers 256 and 258 are mounted on an arm 260 which in turn is attached to a post 262. The post 262 is slidably mounted to move in a transverse direction on a support arm 264 that extends outwardly from the assembly 222. The position of the rollers 256 and 258 is adjusted by sliding the post 262 along the arm 264. To secure the rollers in a selected position, a screw-type mechanical lock 266 is provided on the post 262 that locks the post 262 on the arm 264.

The rollers 256 and 258 compress the upper portions of the box together, thereby pushing the upper flap members of the box toward each other to ensure that the edges of the flaps are in abutting relationship when the tape is applied to the flaps. Without the rollers 256 and 258, the top portion of the box could be taped with the edge portions of the flaps separated. The use of one compression roller on each side of the box, as was used in the prior art, tends to compress the flaps but would not ensure that the edge portions are in parallel relationship. It has been discovered that the use of two compression rollers on each side of the box better controls the flaps that are to be taped and keeps the edge portions of the flaps of the box substantially parallel.

An emergency stop button 268 is positioned on an upper surface of a forward section of the mounting assembly 222. Stop emergency buttons of the prior art have been located on the sides of prior art taping machines. Positioning the stop emergency button 268 on the top surface of the upper head mount assembly 222 provides quick and easy access from both the left side and the right side of the machine in the event of an emergency.

The conveyors 140 and 142, as illustrated in FIG. 8, are mounted to the carriage 22 with a bracket and keyhole mounting system generally indicated at 270 in FIGS. 16 through 18. Both conveyors 140 and 142 are mounted in a like manner to the carriage 22 and therefore only the mounting of conveyor 140 will be described in detail.

The bracket and keyhole mounting system 270 includes upper and lower vertically spaced-apart bolts 272 and 274 bolted on the front panel 34 of the carriage 22. The bolts 272 and 274 are positioned in each of the upper corner portions of the panel 34. Similarly with respect to the rear panel 36, pairs of bolts 272 and 274 are positioned in the upper corner portions thereof.

The bolts 272 and 274 are engaged by upper and lower vertically spaced apart keyholes 276 and 278 disposed at an end portion 280 of the frame member 146 of the conveyor 140. Each of the keyholes 276 and 278 includes a lower aperture 282 and an upper aperture 284. The lower aperture 282 is of sufficient diameter to accept a head 286 of the bolts 272 and 274. The upper aperture 284 is of sufficient diameter to engage a shank 288 of the bolts 272 and 274 but less in diameter than the head of the bolts 272 and 274.

A joining bracket 290 provides additional support for connecting the side frame 140 of the conveyor 140. The joining bracket 290 includes a vertically disposed plate portion 292 and a horizontally disposed plate portion 294. The vertically disposed plate portion 292 includes forward and rearward apertures 296 and 298. The horizontally disposed portion includes forward and rearward apertures 300 and 302. Bolts 304 and 308 are inserted into apertures 296 and 300, respectively, to attach the bracket 290 by threadably engaging the side frame member 146 of the conveyor 140. Bolts 306 and 310 are inserted into apertures 298 and 302, respectively, to attach the bracket by threadably engaging the carriage 22.

The conveyors 140 and 142 are mounted to the front and back panels 34 and 36, respectively, by inserting the bolts 272 and 274 through the lower aperture 282 of the key holes 276 and 278. The side frames 146 are then pushed downwardly such that the shanks 288 of the bolts 270 and 274 engage the upper apertures 284 of the keyholes 276 and 278. The bolts 272 and 274 are then tightened to secure the frame member to the panel. The bracket 290 is then attached to the side frame 146 and the carriage 22 by inserting the bolts 304, 306, 308 and 310 through their respective apertures 296, 298, 300, and 302 in the bracket.

Figure 19:
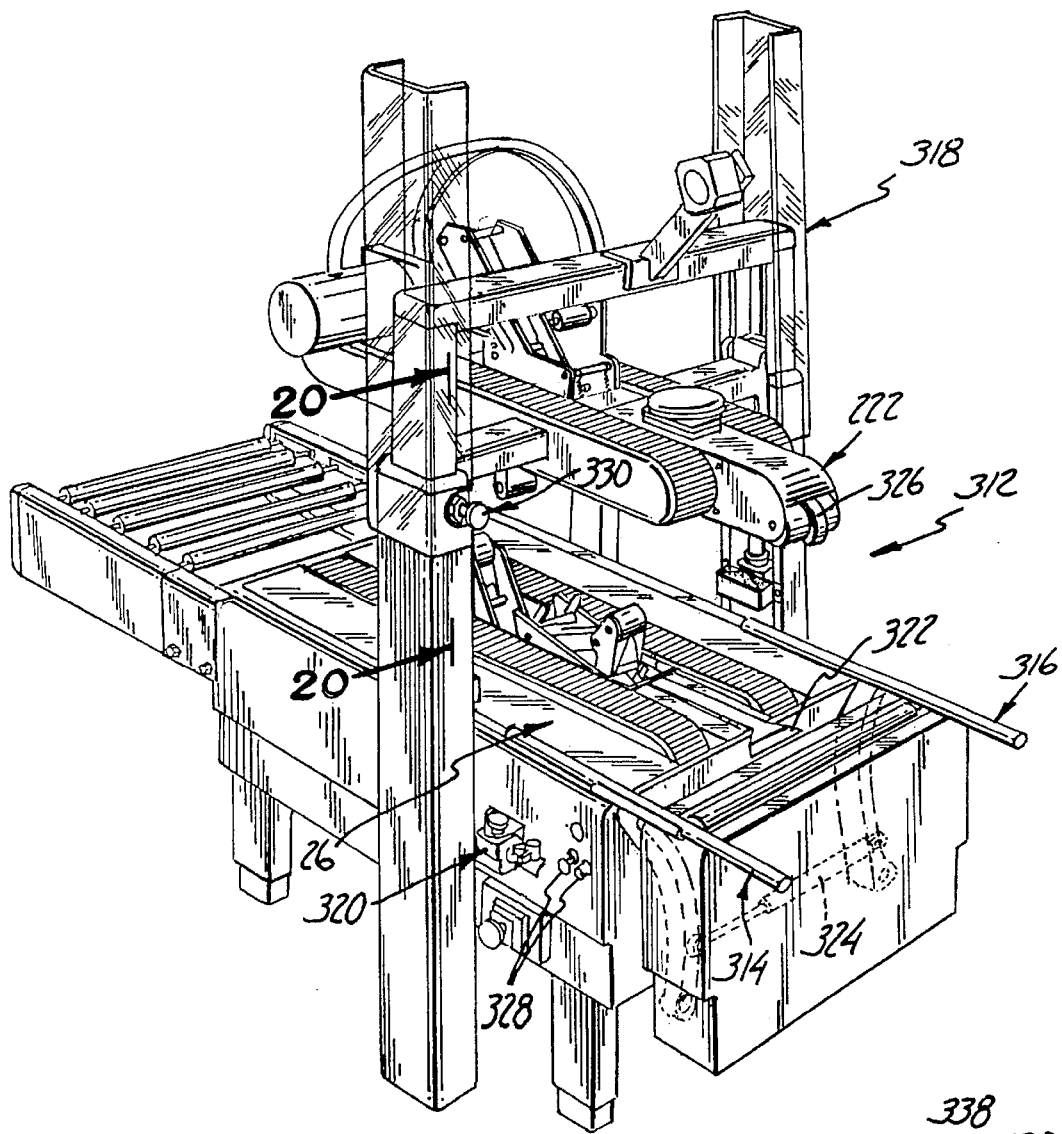
FIG. 19 is yet another alternative embodiment of the machine of the present invention.

Yet another alternative embodiment of the machine of the present invention is generally indicated at 312 in FIG. 19. The embodiment 312 is similar in most respects as the embodiment 216 illustrated in FIG. 13. The machine 312 which will be sold under the trademark 3M-MATIC 700r RANDOM CASE SEALER by Minnesota Mining and Manufacturing Company of Saint Paul, Minn., includes automatically adjusting left and right bed guides 314 and 316 and automatically adjusting bridge 318. The bed guides 314 and 316 and the bridge 318 automatically adjust to the size of the box traveling through the machine. Both the bed guides and the bridge are adjusted by a pneumatic system generally indicated at 320.

The bed guides 314 and 316 are actuated by a bed guide switch 322 positioned along the top surface of the bed 26 to be engaged by a bottom front portion of the box 23. When the bed guide switch 322 is engaged, the switch activates a pneumatic cylinder 324 that brings together the left and right bed guides 314 and 316 until each bed guide engages a respective side of the box 23 centering the box 23 on the bed. This causes the box to be centered and held by the guides. At this point, the box can be filled with product or can be pushed into the machine.

As the box 23 proceeds along the bed 26, a top front portion of the box engages a bridge actuating switch 326 positioned on a front end of the upper tape head mounting assembly 222. The bridge 318 is normally positioned in a lower position at rest so that the switch 326 must be engaged by the approaching box 23. The switch 326 activates pneumatic cylinders (not shown) located in the support columns to raise the bridge 318 to the height of the box 23. The bridge 318 is thereby positioned to apply tape to the top of the box 23.

The pneumatic cylinders that control the position of the bed guides and the bridge are controlled by regulators 328 that control flow of air to the cylinders. The pressure provided by the regulators is adjustable and is such that the pressure applied to a box traveling through the machine is controlled accurately and independently of the pneumatic cylinder position, thereby ensuring that the box does not get damaged due to increased forces that are normally associated with cylinder position.

A mechanical stop 330 is provided to secure the bridge 318 in a raised position when performing maintenance. The mechanical stop 330 ensures that the bridge 318 will not fall if a pneumatic line is accidentally cut or opened during maintenance. In addition, recent OSHA regulations require that when a machine is shut off, no stored energy can be left in the machine. Consequently, once the machine is shut off, the bridge 318 cannot be held up by the pneumatic cylinders since the pressurization of the fluid is stopped. The mechanical stop 330 provides a mechanism to hold the bridge 318 in an up position when the pressurization of the fluid for the pneumatic cylinder is shut off.

Figure 20:
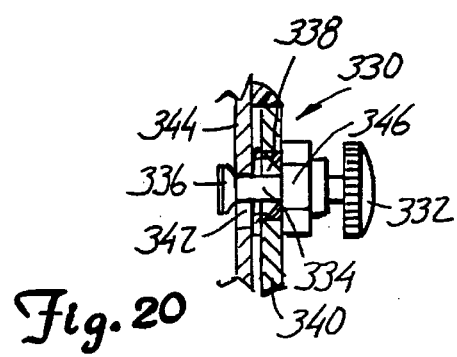
FIG. 20 is a sectional view taken along the line 20—20 in FIG. 19.

As best illustrated in FIG. 20, the mechanical stop 330 includes a handle portion 332 attached to a shaft portion 334, and a flared out end portion 336 attached to a distal end of the shaft portion 334. The shaft portion 334 is positioned within an aperture 338 in an outer support column member 340. To retain the bridge 318 in an up position, the shaft portion 334 is placed through a key hole-type aperture 342 in an inner support column member 344. The key hole aperture 342 has a lower portion whose diameter is larger than the diameter of the flared out end portion 336 and an upper portion whose diameter is less than the flared out end portion and sufficiently large to accept the shaft portion 334. The flared out distal end portion 336 engages an inner surface of the inner support column member 344 preventing the shaft portion 334 from being pulled out of engagement with the inner support column member 344. The shaft portion 334 is slidably attached to the outer support column member 340 by a collar 346 that is fixedly attached to the outer surface of the outer support column member 340.

Although the present invention has been described with reference to preferred embodiments, workers skilled in the art will recognize that changes may be made in form and detail without departing from the spirit and scope of the invention.

What is claimed is:

1. A mounting mechanism for mounting a taping head in a tape applying machine, the mechanism comprising:
   first and second spaced apart panels within the machine defining a taping head receiving aperture, each panel having a pair of spaced apart J-configured slots, each slot having two sections, both sections having a component extending in a vertical direction, one of the two sections having an open end; and
   first and second pairs of pin members extending outwardly from first and second opposing sides of the taping head, the pin members being disposed to engage the J-configured slots.

2. The mounting mechanism of claim 1 wherein the J-configured slot includes a shank portion and an end portion angularly disposed with respect to the shank portion, and further including a retaining mechanism for retaining the pin members within the end portions of the J-configured slots.

3. The mounting mechanism of claim 2 wherein the retaining mechanism includes a stop member having a body portion pivotally attached between the first and second spaced apart panels and having a taping head engaging portion that is movable between a non-taping head engaging position and a taping head engaging position such that when the stop member is in the taping head engaging position, the pin members are retained in the end portion of the J-configured slot.

4. The mounting mechanism of claim 2 wherein the open end of the J-configured slot is facing upwardly.

5. The mechanism of claim 4 wherein the retaining mechanism includes a stop assembly having a distal end portion that is extendable to a position that blocks the pin member from exiting the end portion of the J-configured slot.

6. The mechanism of claim 5 wherein the stop assembly includes a handle having a threadably operable shaft portion with the distal end being disposed at the end of the shaft portion and the distal end being extendable through threadable operation of the shaft.

7. A tape applying machine comprising:

a carriage;

a plurality of ground engaging legs fixedly attached to the carriage for retaining the carriage above the ground;

a lower taping head disposed within the carriage for applying tape to boxes traveling across a top surface of the carriage;

a bridge structure fixedly attached to the carriage and being disposed above the carriage and including mounting means for mounting an upper taping head, the mounting means including first and second spaced apart panels defining a taping head receiving opening, each panel having a pair of spaced apart J-configured slots, each slot having two sections, both sections having a component extending in a vertical direction, one of the two sections having an open end;

an upper taping head positioned within the mounting assembly of the bridge structure for applying tape to the top of boxes being transported across the carriage; and first and second pairs of pin members extending outwardly from first and second opposing sides of the upper taping head, the pin members being disposed to engage the J-configured slots.

8. The machine of claim 7 wherein the J-configured slot includes a shank portion and an end portion angularly disposed with respect to the shank portion, and further including a retaining mechanism for retaining the pin members within the end portions of the J-configured slots.

9. The machine of claim 8 wherein the retaining mechanism includes a stop member having a body portion pivotally attached between the first and second spaced apart panels and having a taping head engaging portion that is movable between a non-taping head engaging position and a taping head engaging position such that when the stop member is in the taping head engaging position, the pin members are retained in the end portion of the J-configured slot.

10. The machine of claim 8 wherein the open end of the J-configured slot is facing upwardly.

11. The machine of claim 10 wherein the retaining mechanism includes a stop assembly having a distal end portion that is extendable to a position that blocks the pin member from exiting the end portion of the J-configured slot.

12. The machine of claim 11 wherein the stop assembly includes a handle having a threadably operable shaft portion with a distal end being disposed at the end of the shaft portion and the distal end being extendable through threadable operation of the shaft.

13. A tape applying machine comprising:

a carriage;

a plurality of ground engaging legs fixedly attached to the carriage for retaining the carriage above the ground;

a taping head disposed within the carriage for applying tape to boxes traveling across a top surface of the carriage; and a tape supply roll holder having a bracket portion and an arm portion, the arm portion being attached to the bracket portion, the bracket being fixedly attached to the carriage at a lower position thereof, and the arm portion having a distal end being disposed at a position away from the carriage such that when a supply roll of tape is attached to the distal end, the supply roll is not underneath the carriage.

14. The machine of claim 13 wherein the taping head includes a plurality of tape transport rollers defining a tape path and wherein the bracket portion and arm portion are disposed such that a supply roll of tape mountable on the distal end of the arm portion is in the same plane as the tape path.

15. The machine of claim 13 and further including a tape transport roller rotatably attached within the bracket portion.

16. The machine of claim 13 wherein the bracket portion includes spaced apart side walls and wherein the arm portion is detachably attachable to either side wall.

* * * * *